US006906770B2

(12) United States Patent
Kim et al.

(10) Patent No.: US 6,906,770 B2
(45) Date of Patent: Jun. 14, 2005

(54) ARRAY SUBSTRATE FOR IN-PLANE SWITCHING LIQUID CRYSTAL DISPLAY DEVICE AND METHOD OF FABRICATING THE SAME

(75) Inventors: Gi-Hong Kim, Gyeonggi-do (KR); Won-Ho Lee, Gyeonggi-do (KR)

(73) Assignee: LG. Philips LCD Co. Ltd., Seoul (KR)

( * ) Notice: Subject to any disclaimer, the term of this patent is extended or adjusted under 35 U.S.C. 154(b) by 6 days.

(21) Appl. No.: 10/732,372

(22) Filed: Dec. 11, 2003

(65) Prior Publication Data

US 2004/0125260 A1 Jul. 1, 2004

(30) Foreign Application Priority Data

Dec. 31, 2002  (KR) ................................ 10-2002-0088083

(51) Int. Cl.[7] .............................................. G02F 1/136
(52) U.S. Cl. ........................................ 349/141; 349/43
(58) Field of Search .................................... 349/141, 43

(56) References Cited

U.S. PATENT DOCUMENTS

| 5,598,285 | A | | 1/1997 | Kondo et al. |
|---|---|---|---|---|
| 5,745,207 | A | | 4/1998 | Asada et al. |
| 5,838,037 | A | | 11/1998 | Masutani et al. |
| 5,946,060 | A | | 8/1999 | Nishiki et al. |
| 5,990,987 | A | | 11/1999 | Tanaka |
| 6,028,653 | A | | 2/2000 | Nishida |
| 6,097,454 | A | | 8/2000 | Zhang et al. |
| 6,738,110 | B2 | * | 5/2004 | Lee .............................. 349/46 |
| 2003/0117560 | A1 | * | 6/2003 | Yang et al. .................. 349/141 |

FOREIGN PATENT DOCUMENTS

| JP | 9-5764 | 1/1997 |
|---|---|---|
| JP | 9-73101 | 3/1997 |
| JP | 9-101538 | 4/1997 |
| JP | 9-105908 | 4/1997 |

OTHER PUBLICATIONS

R. Kiefer, et al. "In–Plane Switching of Nematic Liquid Crystals." *Japan Display.* 1992, pp. 547–550.

M. Ohe–E, et al. "Principles and Characterists of Electro–Optical Behaviour with In–Plane Switching Mode." *Asia Display.* 1995, pp. 577–580.

M. Ohta, et al. "Development of Super–TFT–LCDs with In–Plane Switching Display Mode." *Asia Display.* 1995, pp. 707–710.

S. Matsumoto, et al. "Display Characteristics of In–Plane–Switching (IPS) LCDs a Wide–Viewing–Angle 14.5–in. IPS TFT–LCD." *Euro Display.* 1996, pp. 445–448.

H. Wakemoto, et al. "An Advanced In–Plane–Switching Mode TFT–LCD." *SID Digest.* 1997, pp. 929–932.

(Continued)

*Primary Examiner*—Kenneth Parker
*Assistant Examiner*—(Nancy) Thanh-Nhan P. Nguyen
(74) *Attorney, Agent, or Firm*—Morgan Lewis & Bockius LLP

(57) ABSTRACT

An array substrate of an in-plane switching liquid crystal display device includes a substrate, a gate line and a data line on the substrate crossing each other to define a pixel area, a thin film transistor at the crossing of the gate line and the data line, the thin film transistor including a gate electrode having a first inclined side with respect to the gate line, a semiconductor layer, a source electrode, and a drain electrode, a common line parallel to the gate line, a common electrode having a second inclined side parallel to the first inclined side of the gate electrode within the pixel area, and a pixel electrode alternating with the common electrode within the pixel area, wherein the first inclined side of the gate electrode and the second inclined side of the common electrode are perpendicular to an alignment direction of the array substrate.

25 Claims, 5 Drawing Sheets

OTHER PUBLICATIONS

S.H. Lee, et al. "High Transmittance, Wide–Viewing–Angle Nematic Liquid Crystal Display Controlled by Fringe–Field Switching." *Asia Display*. 1998, pp. 371–374.

S. Endoh, et al. "Advanced 18.1–inch Diagonal Super–T-FT–LCDs with Mega Wide Viewing Angle and Fast Response Speed of 20ms." *IDW*. 1999, pp. 187–190.

* cited by examiner

ARRAY SUBSTRATE FOR IN-PLANE SWITCHING LIQUID CRYSTAL DISPLAY DEVICE AND METHOD OF FABRICATING THE SAME

The present invention claims the benefit of Korean Patent Application No. 2002-88083, filed in Korea on Dec. 31, 2002, which is hereby incorporated by reference.

BACKGROUND OF THE INVENTION

1. Field of the Invention

The present invention relates to a liquid crystal display (LCD) device and a method of fabricating an LCD device, and more particularly, to an array substrate for an in-plane switching (IPS) liquid crystal display device and a method of fabricating an in-plane switching (IPS) liquid crystal display device.

2. Discussion of the Related Art

In general, a liquid crystal display (LCD) device is driven by making use of optical anisotropy and polarization characteristics of a liquid crystal material. The LCD device commonly includes two substrates that are spaced apart and face each other, and a liquid crystal layer interposed between the two substrates. Each of the substrates includes electrodes that face each other, wherein a voltage supplied to each electrode induces an electric field perpendicular to the substrates between the electrodes. An alignment of liquid crystal molecules of the liquid crystal layer is changed by varying an intensity or direction of the applied electric field. Accordingly, the LCD device displays an image by varying light transmittance through the liquid crystal layer in accordance with the arrangement of the liquid crystal molecules. Thus, the LCD device has superior light transmittance and aperture ratio.

An LCD device that includes thin film transistors and a matrix configuration of pixel electrodes, which is referred to as an active matrix LCD device, is commonly used because of its high resolution and ability to quickly display moving images. However, the LCD device is disadvantageous due to its narrow viewing angle. To overcome the narrow viewing angle, an in-plane switching (IPS) LCD device has been developed that implements an electric field that is parallel to surfaces of the substrates.

FIG. 1 is a plan view of an array substrate for an in-plane switching (IPS) liquid crystal display (LCD) device according to the related art. In FIG. 1, a gate line 12 is formed along a first direction on a substrate 10, and a common line 16 is formed along the first direction parallel to the gate line 12. In addition, a data line 24 is formed along a second direction perpendicular to the first direction to cross the gate line 12 and the common line 16. Accordingly, the data line 24 and the gate line 12 define a pixel area P.

A thin film transistor T is formed at the crossing of the gate line 12 and the data line 24 to function as a switching element. The thin film transistor T is composed of a gate electrode 14 that is connected to the gate line 12, a source electrode 26 that is connected to the data line 24, a drain electrode 28 that is spaced apart from the source electrode 26, and a semiconductor layer 20 that is disposed between the gate electrode 14 and the source and drain electrodes 26 and 28. The source electrode 26 may have a U-shape, and may surround a part of the drain electrode 28, which may have a rod shape.

In the pixel area P, a pixel electrode 30 and a common electrode 17 are formed, wherein the pixel electrode 30 is connected to the drain electrode 28 and the common electrode 17 is connected to the common line 16. The pixel electrode 30 is composed of an extension part 30a, a plurality of vertical parts 30b, and a horizontal part 30c. The extension part 30a is connected to the drain electrode 28, and the plurality of vertical parts 30b, which are spaced apart from each other, vertically extend from the extension part 30a. The horizontal part 30c overlaps the common line 16 and is connected to the plurality of vertical parts 30b.

The common electrode 17 includes a horizontal portion 17a and a plurality of vertical portions 17b, wherein the horizontal portion 17a overlaps the extension part 30a of the pixel electrode 30. The plurality of vertical portions 17b vertically extend from the common line 16 and are alternately arranged with the plurality of vertical parts 30b of the pixel electrode 30. The plurality of vertical portions 17b are connected to the horizontal portion 17a of the common electrode 17.

The common line 16 and the horizontal part 30c of the pixel electrode 30 form a storage capacitor C that is parallel to a liquid crystal capacitor. Accordingly, the common line 16 functions as a first storage electrode and the horizontal part 30c functions as a second storage electrode.

Although not shown in the figure, the array substrate may further include an alignment layer, which may be rubbed at an angle of about 110 degrees with respect to the gate line 12.

FIG. 2 shows voltage waveforms of a liquid crystal display device according to the related art. In FIG. 2, when a gate voltage Vg in an ON-state, a gate high voltage Vgh of about +18V is applied. When the gate voltage Vg is in an OFF-state, a gate low voltage Vgl of about −5V is applied. In addition, a data voltage Vd has an alternating polarity between Vdh to Vdl. When a thin film transistor is turned ON by the gate high voltage Vgh, a value of the data voltage Vd is transmitted to a pixel electrode, i.e., a liquid crystal capacitor, and the value of the data voltage Vg is maintained until the next gate high voltage Vgh is supplied. A common voltage Vcom may have a value within a range of about 3V to about 5V.

In general, in a normally black (NB) mode, when no voltage is supplied, a black image is displayed. However, in the liquid crystal display device including the array substrate of FIG. 1, light leakage may occur at an initial time. For example, in FIG. 1, the gate low voltage Vgl is initially supplied to the gate electrode, while the common voltage Vcom of about 3V to about 5V is also supplied to the common electrode. Thus, there is a voltage difference between the gate electrode and the common electrode, whereby light may leak between the gate electrode and the common electrode.

FIGS. 3 and 4 are enlarged plan views of region A of FIG. 1 according to the related art and show a light leakage area. FIG. 3 shows an original arrangement of liquid crystal molecules, and FIG. 4 shows an initial arrangement of the liquid crystal molecules when gate voltage is initial in an OFF-state. In FIG. 3, the liquid crystal molecules 50 are originally arranged along a rubbing direction B that is at an angle of about 110 degrees with respect to the gate line 12. In FIG. 4, when the gate voltage is initially in an OFF-state, there is a voltage difference between the gate electrode 14 and the common electrode 17 due to the gate low voltage and the common voltage. Thus, an electric field is induced between the gate electrode 14 and the common electrode 17. The gate electrode 14 and the common electrode 17 have inclined sides that are parallel to the rubbing direction B.

Accordingly, the liquid crystal molecules 50 between the gate electrode 14 and the common electrode 17 are arranged along the electric field E perpendicular to the rubbing direction B, while other liquid crystal molecules 50 are arranged along the rubbing direction B. Thus, light leakage occurs between the gate electrode 14 and the common electrode 17. In order to prevent the light leakage, a black matrix may shield the portion between the gate electrode 14 and the common electrode 17. However, light may be transmitted within the portion of the gate electrode 14 and the common electrode 17 due to misalignment between the two substrates of the liquid crystal display device, thereby making it difficult to achieve a display device displaying high quality images.

SUMMARY OF THE INVENTION

Accordingly, the present invention is directed to an array substrate for an in-plane switching (IPS) liquid crystal display device that substantially obviates one or more of the problems due to limitations and disadvantages of the related art.

An object of the present invention is to provide an array substrate for an in-plane switching (IPS) liquid crystal display device having improved light leakage prevention.

Another object of the present invention is provide a method of fabricating an array substrate for an in-plane switching (IPS) liquid crystal display device having improved light leakage prevention.

Another object of the present invention is to provide an array substrate for an in-plane switching (IPS) liquid crystal display device having improved image quality.

Another object of the present invention is to provide a method of fabricating an array substrate for an in-plane switching (IPS) liquid crystal display device having improved image quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate of an in-plane switching liquid crystal display device includes a substrate, a gate line and a data line on the substrate crossing each other to define a pixel area, a thin film transistor at the crossing of the gate line and the data line, the thin film transistor including a gate electrode having a first inclined side with respect to the gate line, a semiconductor layer, a source electrode, and a drain electrode, a common line parallel to the gate line, a common electrode having a second inclined side parallel to the first inclined side of the gate electrode within the pixel area, and a pixel electrode alternating with the common electrode within the pixel area, wherein the first inclined side of the gate electrode and the second inclined side of the common electrode are perpendicular to a rubbing direction of the array substrate.

In another aspect, a method of fabricating an array substrate of an in-plane switching liquid crystal display device includes forming a gate line and a data line on a substrate crossing each other to define a pixel area, forming a thin film transistor at the crossing of the gate line and the data line, the thin film transistor including a gate electrode having a first inclined side with respect to the gate line, a semiconductor layer, a source electrode, and a drain electrode, forming a common line parallel to the gate line, forming a common electrode having a second inclined side parallel to the first inclined side of the gate electrode within the pixel area, forming a pixel electrode alternating with the common electrode within the pixel area, and forming an alignment direction of the array substrate, the alignment direction being perpendicular to the first inclined side of the gate electrode and the second inclined side of the common electrode.

In another aspect, an array substrate of a liquid crystal display device includes a gate line and a data line on a substrate crossing each other to define a pixel area, a thin film transistor at the crossing of the gate line and the data line including a gate electrode having a first inclined side extending along a first direction with respect to the gate line, a common line parallel to the gate line, a common electrode having a horizontal portion connected to a plurality of vertical portions, the horizontal portion having a second inclined side extending along the first direction, and a pixel electrode having a plurality of vertical portions alternating with the plurality of vertical portions of the common electrode, wherein the array substrate includes a second direction perpendicular to the first direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the illustrated embodiments of the present invention, examples of which are illustrated in the accompanying drawings.

Figure 1:
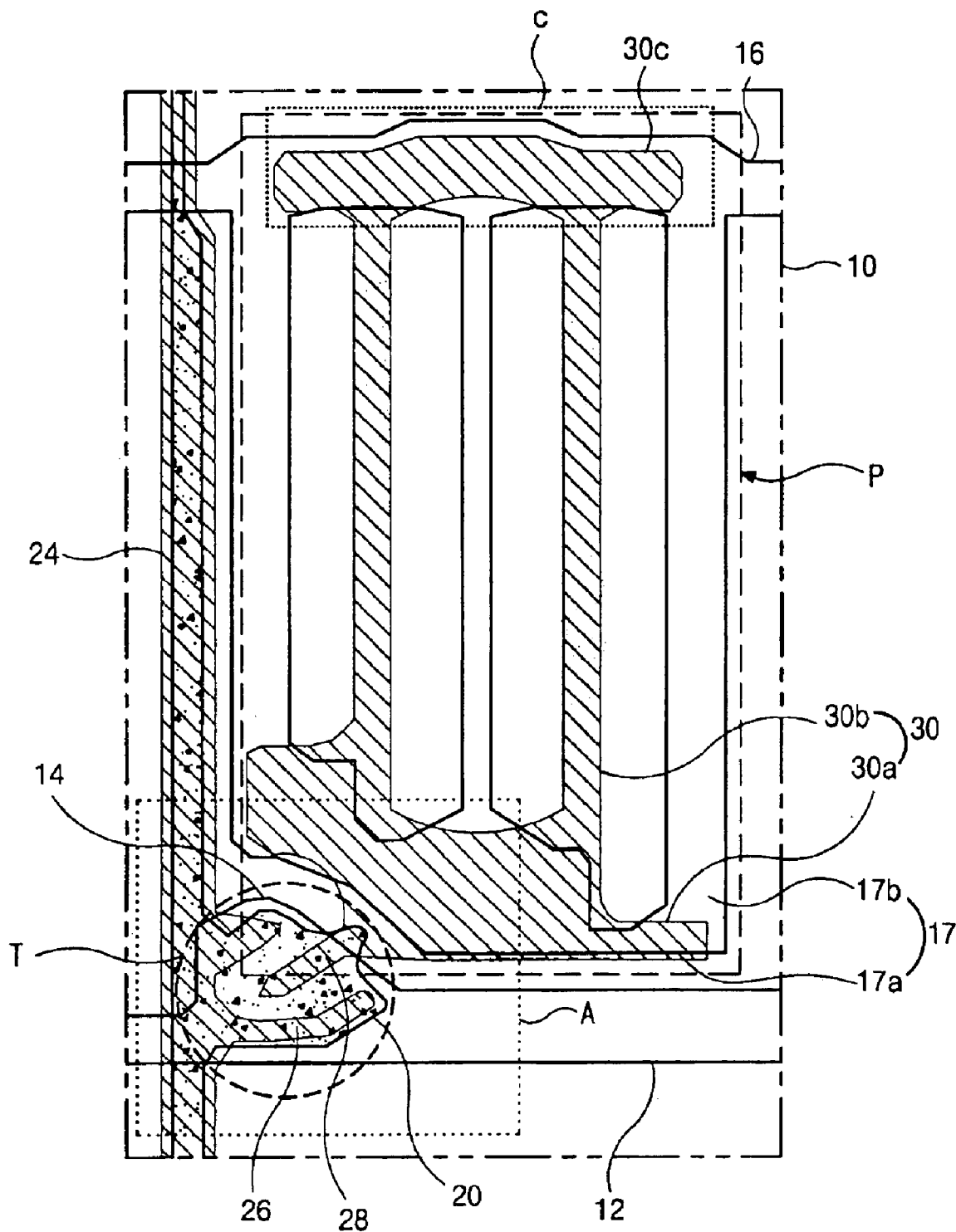
FIG. 1 is a plan view of an array substrate for an in-plane switching (EPS) liquid crystal display (LCD) device according to the related art.
Figure 2:
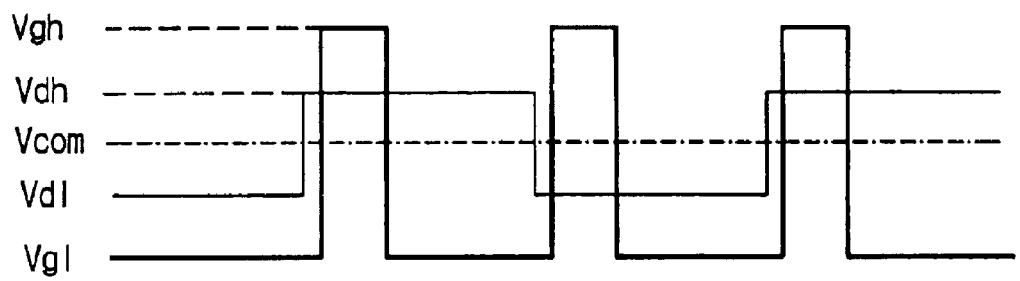
FIG. 2 is a schematic view showing voltage waveforms of a liquid crystal display device according to the related art.
Figure 3:
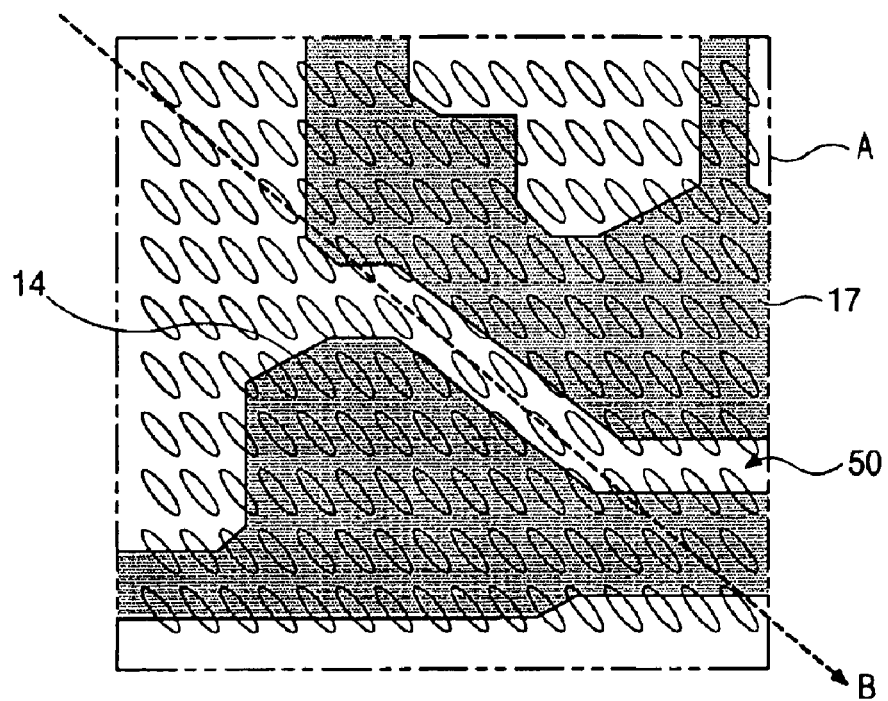
FIGS. 3 and 4 are enlarged plan views of region A of FIG. 1 according to the related art.
Figure 4:
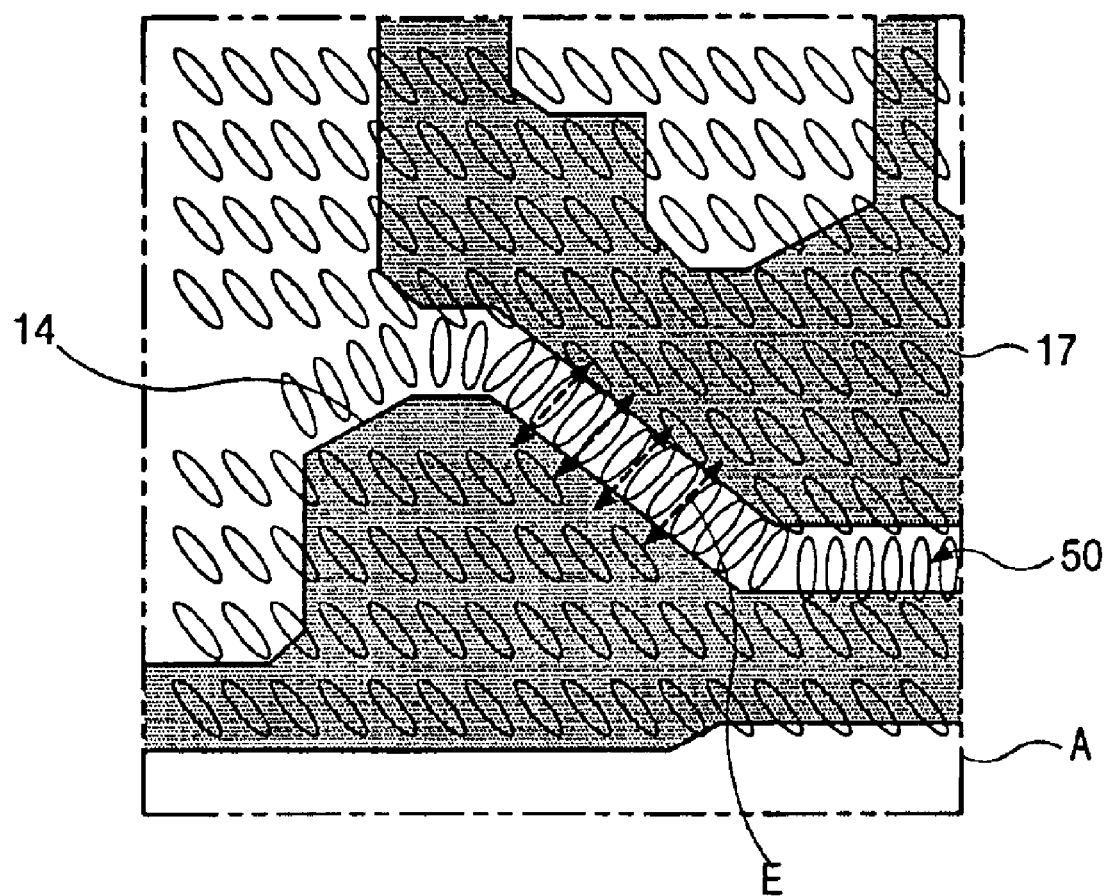
Figure 5:
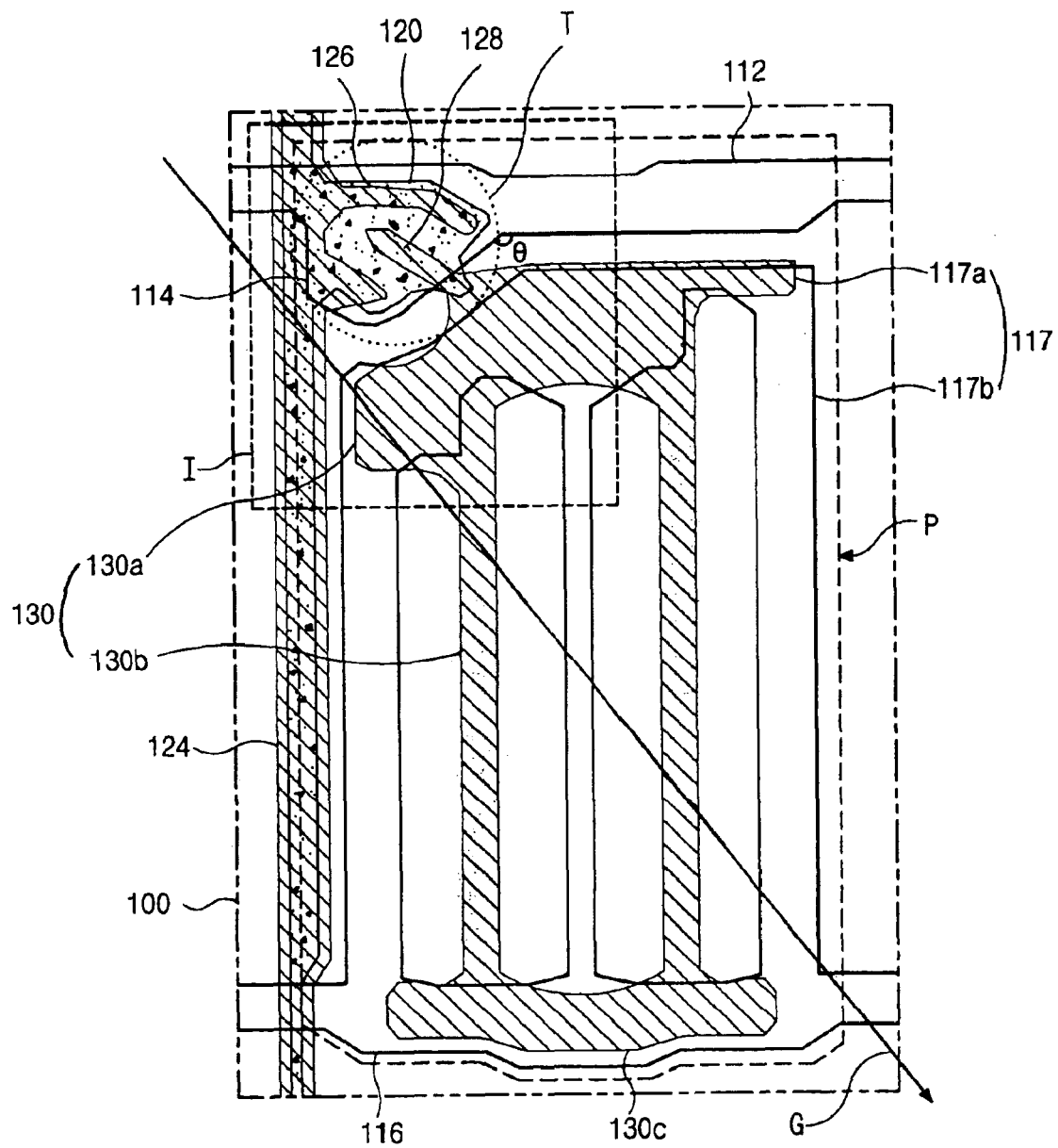
FIG. 5 is a plan view of an exemplary array substrate for an IPS LCD device according to the present invention.

FIG. 5 is a plan view of an exemplary array substrate for an IPS LCD device according to the present invention. In FIG. 5, a gate line 112 may be formed along a first direction on a substrate 100, and a common line 116 may be formed along the first direction parallel to the gate line 112 on the substrate 100. In addition, a data line 124 may be formed on the substrate 100 along a second direction perpendicular to the first direction to cross the gate line 112 and the common line 116, wherein the data line 124 and the gate line 112 may define a pixel area P.

A thin film transistor T may be formed at the crossing of the gate and data lines 112 and 124 to function as a switching element. The thin film transistor T may include a gate electrode 114 that may be connected to the gate line 112, a source electrode 126 that may be connected to the data line 124, a drain electrode 128 that may be spaced apart from the source electrode 126, and a semiconductor layer 120 between the gate electrode 114 and the source and drain electrodes 126 and 128.

In the array substrate, the source electrode 126 may have a U-shape, and the drain electrode 128 may have a rod shape that may be surrounded by the source electrode 126. Accordingly, a channel of the thin film transistor T, which corresponds to the semiconductor layer 120 between the source electrode 126 and the drain electrode 128, may also have a U-shape. Since a length of the channel decreases and a width of the channel increases, current flowing through the channel may increase.

In FIG. 5, the gate electrode 114 may have a first inclined side extending along a first direction with respect to the gate line 112. The first inclined side (i.e., the first direction) of the gate-electrode 114 may form an angle θ of about 160 degrees with the gate line 112, wherein the thin film transistor T may be positioned in an left-upper portion of the pixel area P. In addition, a pixel electrode 130 and a common electrode 117 may be formed in the pixel area P, wherein the common electrode 117 may include a horizontal portion 117a and a plurality of vertical portions 117b. First end portions of the vertical portions 117b may be connected to the common line 116, and second end portions of the vertical portions 117b may be connected to the horizontal portion 117a.

The pixel electrode 130 may include an extension portion 130a, a plurality of vertical portions 130b, and a horizontal portion 130c. The extension portion 130a may extend from the drain electrode 128, and may overlap the horizontal portion 117a of the common electrode 117. The plurality of vertical potions 130b may be alternatingly arranged with the plurality of vertical portions 117b of the common electrode 117. First end portions of the vertical portions 130b may be connected to the extension portion 130a of the pixel electrode 130, and second end portions of the vertical portions 130b may be connected to the horizontal portion 130c of the pixel electrode 130. The horizontal portion 130c of the pixel electrode 130 may overlap the common line 116, thereby forming a storage capacitor.

Figure 6:
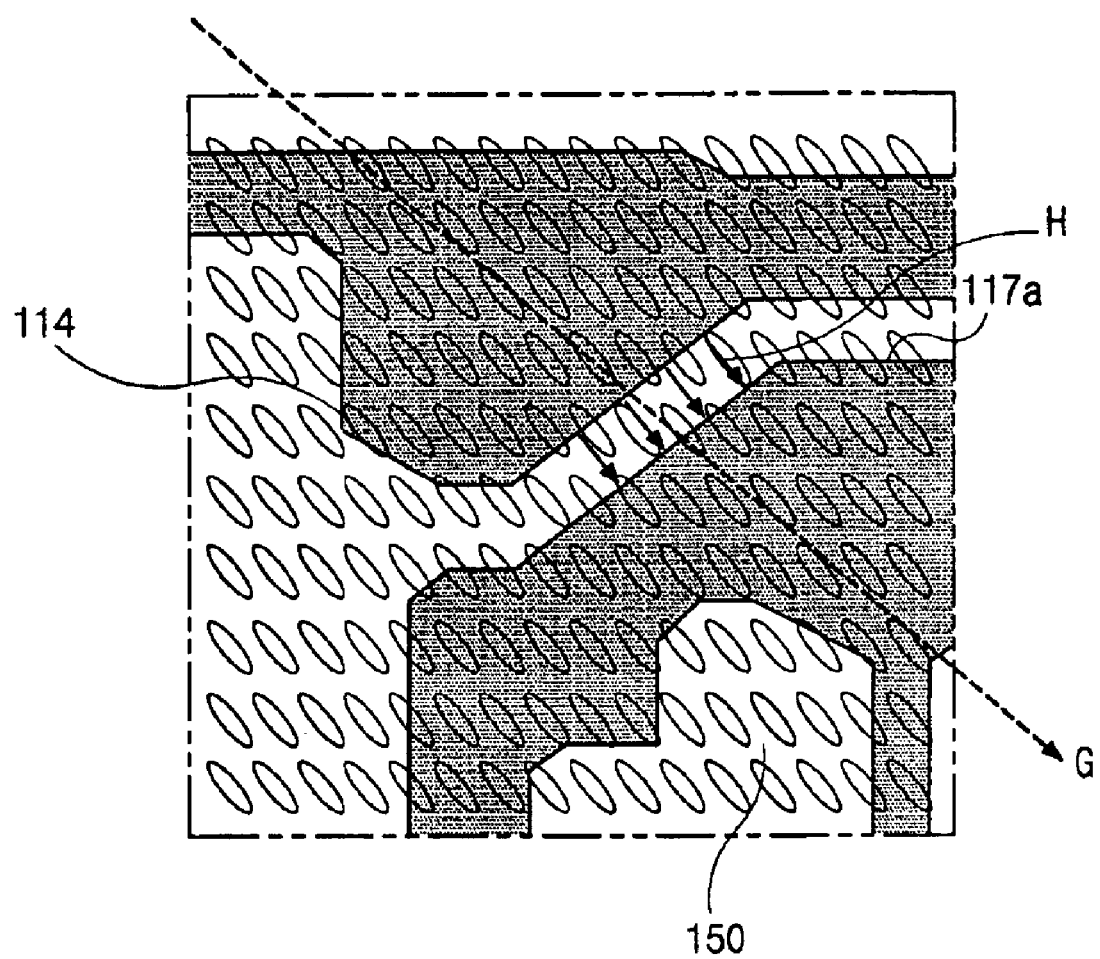
FIG. 6 is an enlarged plan view of region I of FIG. 5 according to the present invention.

The horizontal portion 117a of the common electrode 117 may have a second inclined side extending along the first direction with respect to the gate line 112 that may face and be parallel to the first inclined side of the gate electrode 114. The first inclined side and the second inclined side (i.e., the first direction) may be perpendicular to a rubbing direction G (i.e., second direction) that may form an angle of about 110 degrees with respect to the gate line 112. Thus, when a gate low voltage is supplied at an initial time, an electric field induced between the gate electrode 114 and the horizontal portion 117a of the common electrode 117 may be parallel to the rubbing direction G FIG. 6 is an enlarged plan view of region I of FIG. 5 according to the present invention. In FIG. 6, only the gate line 112 (in FIG. 5), the gate electrode 114, and the common electrode 117 are shown for the sake of brevity. As shown in FIG. 6, the gate electrode 114 and the horizontal portion 117a of the common electrode 117 may have inclined sides forming an angle of about 160 degrees with respect to the gate line 112, and the gate electrode 114 and the horizontal portion 117a of the common electrode 117 may face each other. Thus, an electric field H induced between the gate electrode 114 and the horizontal portion 117a of the common electrode 117 may be parallel to the rubbing direction G, which may form an angle of about 110 degrees with respect to the gate line 112. Accordingly, liquid crystal molecules 150 between the gate electrode 114 and the horizontal portion 117a of the common electrode 117 may be arranged parallel to the rubbing direction G similarly to other liquid crystal molecules 150.

According to the present invention, although the gate low voltage may be initially supplied, light leakage may not occur and a clear black image may be displayed. Thus, image quality of the LCD device may be improved. In addition, an aligning margin for attaching two substrates of the liquid crystal display device may be reduced.

It will be apparent to those skilled in the art that various modifications and variations can be made in the array substrate for in-plane switching liquid crystal display device of the present invention without departing from the spirit or scope of the invention. Thus, it is intended that the present invention cover the modifications and variations of this invention provided they come within the scope of the appended claims and their equivalents.

What is claimed is:

1. An array substrate of an in-plane switching liquid crystal display device, comprising:

a substrate;

a gate line and a data line on the substrate crossing each other to define a pixel area;

a thin film transistor at the crossing of the gate line and the data line, the thin film transistor including a gate electrode having a first inclined side with respect to the gate line, a semiconductor layer, a source electrode, and a drain electrode;

a common line parallel to the gate line;

a common electrode having a second inclined side parallel to the first inclined side of the gate electrode within the pixel area; and a pixel electrode alternating with the common electrode within the pixel area, wherein the first inclined side of the gate electrode and the second inclined side of the common electrode are perpendicular to an alignment direction of the array substrate.

2. The array substrate according to claim 1, wherein the common electrode includes a plurality of vertical portions.

3. The array substrate according to claim 2, wherein the common electrode further includes a horizontal portion connected to the plurality of vertical portions, the horizontal portion having the second inclined side.

4. The array substrate according to claim 1, wherein the alignment direction forms an angle of about 110 degrees with respect to the gate line.

5. The array substrate according to claim 4, wherein the first inclined side of the gate electrode and the second inclined side of the common electrode form an angle of about 160 degrees with respect to the gate line.

6. The array substrate according to claim 1, wherein the thin film transistor has a U-shaped channel corresponding to the semiconductor layer between the source electrode and the drain electrode.

7. The array substrate according to claim 1, wherein the pixel electrode includes a plurality of vertical portions.

8. The array substrate according to claim 7, wherein the pixel electrode further includes an extension portion connected to first end portions of the plurality of vertical portions and a horizontal portion connected to second end portions of the plurality of vertical portions.

9. The array substrate according to claim 8, wherein the horizontal portion of the pixel electrode overlaps the common line to form a storage capacitor.

10. A method of fabricating an array substrate of an in-plane switching liquid crystal display device, comprising:
   forming a gate line and a data line on a substrate crossing each other to define a pixel area;
   forming a thin film transistor at the crossing of the gate line and the data line, the thin film transistor including a gate electrode having a first inclined side with respect to the gate line, a semiconductor layer, a source electrode, and a drain electrode;
   forming a common line parallel to the gate line;
   forming a common electrode having a second inclined side parallel to the first inclined side of the gate electrode within the pixel area;
   forming a pixel electrode alternating with the common electrode within the pixel area; and
   forming an alignment direction of the array substrate, the alignment direction being perpendicular to the first inclined side of the gate electrode and the second inclined side of the common electrode.

11. The method according to claim 10, wherein the common electrode includes a plurality of vertical portions.

12. The method according to claim 11, wherein the common electrode further includes a horizontal portion connected to the plurality of vertical portions, the horizontal portion having the second inclined side.

13. The method according to claim 10, wherein the alignment direction forms an angle of about 110 degrees with respect to the gate line.

14. The method according to claim 13, wherein the first inclined side of the gate electrode and the second inclined side of the common electrode form an angle of about 160 degrees with respect to the gate line.

15. The method according to claim 10, wherein the thin film transistor has a U-shaped channel corresponding to the semiconductor layer between the source electrode and the drain electrode.

16. The method according to claim 10, wherein the pixel electrode includes a plurality of vertical portions.

17. The method according to claim 16, wherein the pixel electrode further includes an extension portion connected to first end portions of the plurality of vertical portions and a horizontal portion connected to second end portions of the plurality of vertical portion.

18. The method according to claim 17, wherein the horizontal portion of the pixel electrode overlaps the common line to form a storage capacitor.

19. An array substrate of a liquid crystal display device, comprising:
   a gate line and a data line on a substrate crossing each other to define a pixel area;
   a thin film transistor at the crossing of the gate line and the data line including a gate electrode having a first inclined side extending along a first direction with respect to the gate line;
   a common line parallel to the gate line;
      a common electrode having a horizontal portion connected to a plurality of vertical portions, the horizontal portion having a second inclined side extending along the first direction; and
      a pixel electrode having a plurality of vertical portions alternating with the plurality of vertical portions of the common electrode,
      wherein the array substrate includes a second direction perpendicular to the first direction.

20. The array substrate according to claim 19, wherein the second direction forms an angle of about 110 degrees with respect to the gate line.

21. The array substrate according to claim 20, wherein the first direction forms an angle of about 160 degrees with respect to the gate line.

22. The array substrate according to claim 19, wherein the thin film transistor further includes a source electrode, a drain electrode, and a U-shaped channel region corresponding to a semiconductor layer between the source electrode and the drain electrode.

23. The array substrate according to claim 22, wherein the drain electrode includes a rod shape surrounded by the source electrode.

24. The array substrate according to claim 19, wherein the pixel electrode further includes an extension portion connected to first end portions of the plurality of vertical portions and a horizontal portion connected to second end portions of the plurality of vertical portions.

25. The array substrate according to claim 24, wherein the horizontal portion of the pixel electrode overlaps the common line to form a storage capacitor.

* * * * *